(12) United States Patent
Zimmerman

(10) Patent No.: US 11,827,510 B2
(45) Date of Patent: Nov. 28, 2023

(54) PHARMACEUTICAL TRANSPORT SYSTEM

(71) Applicant: David S. Zimmerman, Brick Township, NJ (US)

(72) Inventor: David S. Zimmerman, Brick Township, NJ (US)

( * ) Notice: Subject to any disclaimer, the term of this patent is extended or adjusted under 35 U.S.C. 154(b) by 614 days.

(21) Appl. No.: 17/076,167

(22) Filed: Oct. 21, 2020

(65) Prior Publication Data

US 2021/0122624 A1 Apr. 29, 2021

Related U.S. Application Data

(60) Provisional application No. 62/925,808, filed on Oct. 25, 2019.

(51) Int. Cl.
*F16L 5/00* (2006.01)
*B67D 3/00* (2006.01)
*F16L 5/02* (2006.01)

(52) U.S. Cl.
CPC ............. *B67D 3/008* (2013.01); *F16L 5/022* (2013.01)

(58) Field of Classification Search
None
See application file for complete search history.

(56) References Cited

U.S. PATENT DOCUMENTS

| | | | | |
|---|---|---|---|---|
| 274,434 A | * | 3/1883 | Bride | F16L 5/02 285/56 |
| 2,343,896 A | * | 3/1944 | Fishko | F16L 5/02 285/19 |
| 2012/0273064 A1 | * | 11/2012 | Ismert | F16L 5/14 137/360 |
| 2017/0292254 A1 | * | 10/2017 | Gogoulis | E03C 1/284 |
| 2018/0301234 A1 | * | 10/2018 | Wang | G21F 7/00 |
| 2020/0271244 A1 | * | 8/2020 | Iannone | E04B 2/7407 |

* cited by examiner

*Primary Examiner* — Steven M Marsh
(74) *Attorney, Agent, or Firm* — Renner, Kenner, Greive, Bobak, Taylor & Weber Co. LPA

(57) ABSTRACT

A pharmaceutical transport system and associated piping and utility panel are presented. The utility panel is received within an opening within a ceiling of a clean room and supported by the ceiling about a perimeter thereof by means of an attached angle member or an integral flange. The use of the angle member or flange accommodates ease of installation. Included as part of the system of the invention are hubs having a bore therethrough that is offset from the axis of the hub itself by an amount ensuring desired angling of the associated transport pipes to accommodate drainage or plumb risers. Also included are bends providing transitions between vertical and sloped horizontal pipes.

20 Claims, 4 Drawing Sheets

PHARMACEUTICAL TRANSPORT SYSTEM

CROSS-REFERENCE TO RELATED APPLICATION

This non-provisional application claims priority to U.S. Provisional Patent Application No. 65/925,808, filed Oct. 25, 2019.

TECHNICAL FIELD

The invention herein resides in the art of industrial piping systems, and more particularly such systems as are used for transporting fluid from one work station to another in a manufacturing process. Specifically, the invention relates to a piping transport system for use in a fluid manufacturing process, and particularly the structures and methods for effecting the same. Most particularly, the invention relates to a utility panel that may be easily placed within an opening within a ceiling of a clean room for passing fluid- and/or gas-carrying pipe from outside the clean room into the processing area of the clean room, and to do so in an efficient and cost-effective manner. The system also includes hubs and bends for receiving and securing the pipes of the system in appropriate angles of declination and inclination as necessary.

BACKGROUND ART

With reference to FIGS. 1-3, an appreciation may be obtained of the utility panels of prior art pharmaceutical transport systems, the same being typically positioned in the ceiling of a clean room and accommodating the introduction of transport pipes from outside the clean room into the clean room.

As shown in FIGS. 1-3, the transfer panel of the prior art is designated generally by the numeral 10 and is typically provided with a faceplate 12. Side plates 14 are interconnected with each other and the faceplate 12 to form a rectangular or square panel, as the need demands. Tubes 16, generally of rectangular cross-section, are positioned at each corner of the panel where the side plates 14 intersect and are connected to extend vertically upward as shown in FIG. 1. At the upward end of each of the tubes 16 is a foot 18, each foot 18 having a hole or aperture 20 extending therethrough. The hole 20 is provided to receive screws, bolts, or other appropriate connecting means to connect the feet 18 to beams, joists, or similar fixed structure of the building housing the clean room.

Often included in the control panels of the prior art are partition plates 22, separating the panel 10 into isolated compartments, such as an electrical/data compartment 24 and a fluid/gas compartment 26.

Passing through the faceplate 12 are a plurality of nozzles 28 to connect the inlet and outlet pipes for the liquids and gases to transfer from outside the clean room to within the clean room through the transfer panel 10. These nozzles, as known in the art, provide for interconnecting AWFI, process, WFIS, CA, IAP, FIT, and other pipes as will be readily appreciated by those skilled in the art.

The transfer panel 10 is typically manufactured of stainless steel and is of significant size, having a length in the range of 3.5 feet, a width of 2.5 feet, and a depth of 1.5 feet. The panel is typically made of 0.25 inch thick stainless steel plate. The weight and bulk of the panel along with the required method of installation typically requires the work of a crew of four an entire day to install. The prior art would require construction personnel to install the panel from below the ceiling and then winch it into place. The prior art typically requires risers with bases for installation, and requires four attachment points to the building infrastructure above the walkable ceiling. The cost incident to the manufacture and installation of the prior art panels 10 was significant.

Pharmaceutical systems have also typically required that the "horizontal" pipes of the system be installed with a drainage or riser angle on the order of 2° deviation from horizontal. Such would accommodate draining and purging of the lines.

In prior art installations, the stainless steel pipe was simply manually deflected and clamped to approximately the required 2° departure. Such a process was not only inaccurate, but also subjected the pipe to damage from flexing or deflection by bending. The finished interior surface of the stainless steel pipes could be damaged without detection.

Additionally, welding of pipes to clamps or to each other can give rise to damage to the interior polished finish of the pipes as a result of exposure to welding temperatures.

In light of the foregoing, there is a need in the art for a pharmaceutical transport system in which the transfer panel may be installed quickly and easily, and in which devices can be employed in association with the pipes to ensure the 2° angles of declination or inclination as the system requires, and to do so without risk of damage to the pipes themselves.

DISCLOSURE OF INVENTION

In light of the foregoing, it is a first aspect of the invention to provide a transfer panel for a pharmaceutical transport system which is easy to install and self-supporting from a walkable ceiling, typically without the need of interconnecting with building infrastructure.

Another aspect of the invention is the provision of a pharmaceutical transport system which incorporates devices for ensuring the proper angled installation of horizontal pipes within the system.

Yet a further aspect of the invention is the provision of a pharmaceutical transport system which is cost-effective in manufacture and use, readily constructed with state-of-the-art materials and techniques, and reliable and durable in operation.

The foregoing and other aspects of the invention that will become apparent as the detailed description proceeds are achieved by a pharmaceutical transport system, comprising: a utility panel received within an opening within a ceiling of a clean room and supported by said ceiling about at least portions of a perimeter of said utility panel; pipes extending from said utility panel into said clean room; and hubs receiving and passing said pipes at a decline from the horizontal, said decline accommodating drainage of said pipes.

Other aspects of the invention that will become apparent as the detailed description proceeds are achieved by a liquid transport system, comprising: a utility panel received within an opening of a ceiling within a room; a flange extending from said panel, said flange received and supported by a back side of the ceiling; pipes extending from outside the room through said utility panel, into the room, and then from the room; and hubs and bends interconnecting said pipes as they pass into, through, and out of the room.

BRIEF DESCRIPTION OF THE DRAWINGS

For a complete understanding of the various aspects of the invention, reference should be made to the following detailed description and accompanying drawings wherein.

DETAILED DESCRIPTION OF PREFERRED EMBODIMENTS

Figure 1:
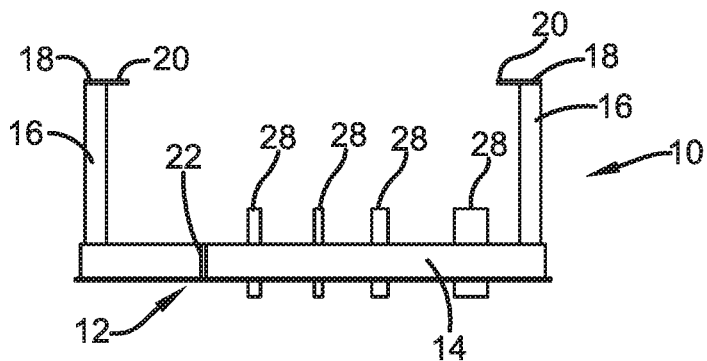
FIG. 1 is a side elevational view of a transfer panel of the prior art.
Figure 2:
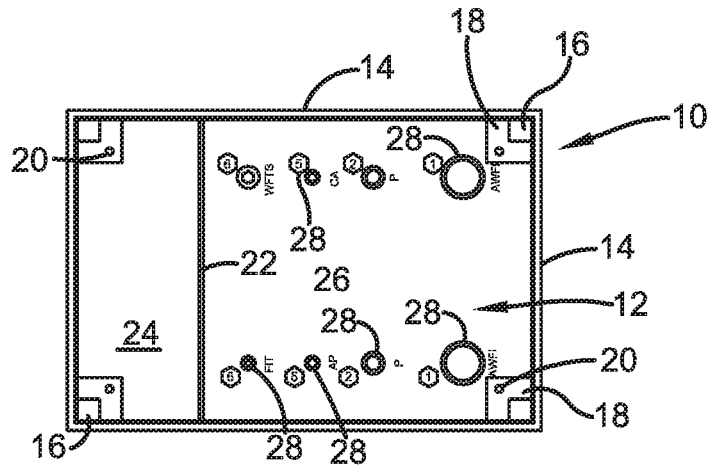
FIG. 2 is a top plan view of the panel of FIG. 1.
Figure 3:
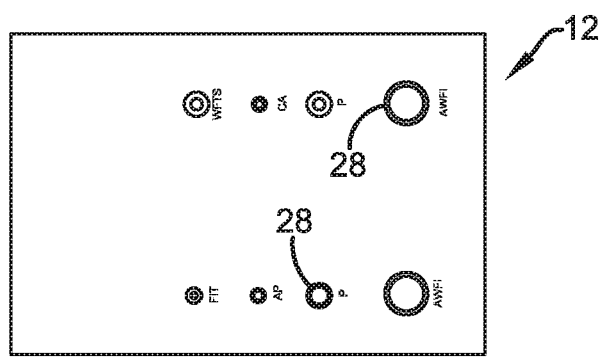
FIG. 3 is a top plan view of the faceplate employed by the panel of FIGS. 1 and 2.
Figure 4:
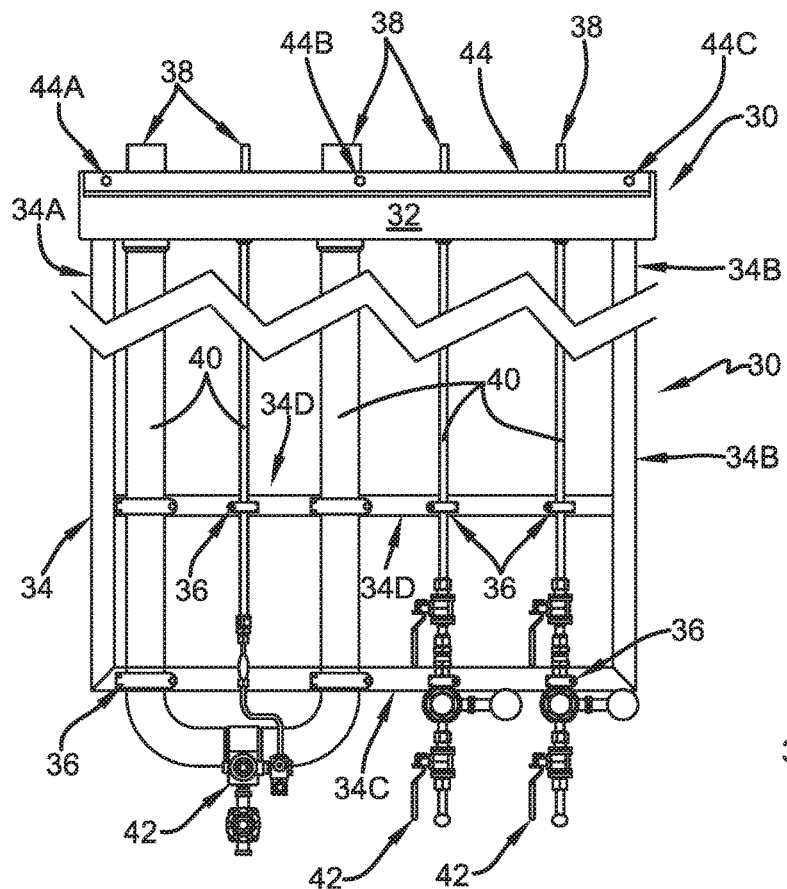
FIG. 4 is a front elevational view of the pharmaceutical utility panel of the invention.
Figure 6:
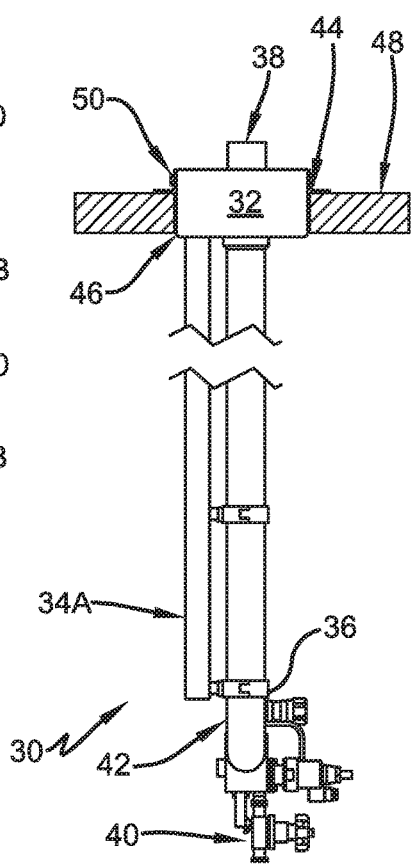
FIG. 6 is a side elevational view of the utility panel of FIG. 4.
Figure 5:
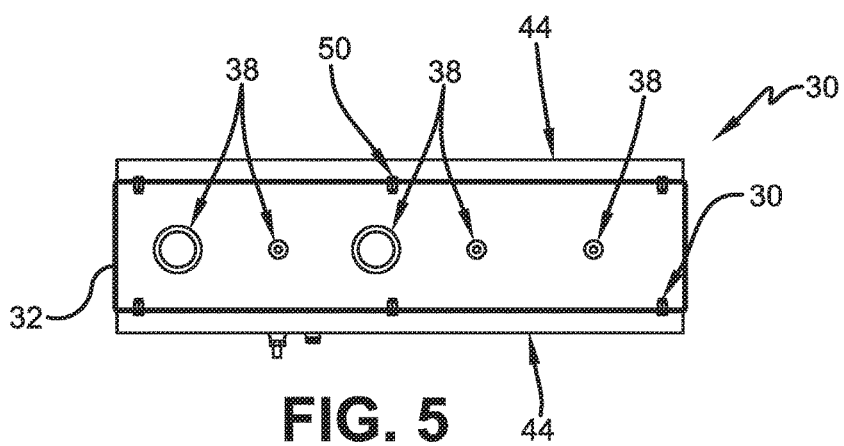
FIG. 5 is a top plan view of the panel of FIG. 4.

With continued reference to the drawings and particularly FIGS. 4-6, an appreciation can be obtained with regard to the pharmaceutical utility panel 30 of the invention. The utility panel 30 consists of a ceiling pan 32 of stainless steel construction. A frame 34 is connected by welding or the like to the ceiling pan 32. The frame 34 consists of vertical side frame members 34A, 34B, a horizontal bottom frame member 34C, and a cross-frame member 34D. Each of the frame members is preferably a tubular member of rectangular cross-section. Alternatively, a stainless steel plate construction may be substituted.

A plurality of clamps 36 are provided on the cross-frame member 34D and horizontal bottom frame member 34C to secure the various piping structures and other apparatus employed by the system. A plurality of pipe nozzles 38 extend up through the ceiling pan 32 and interconnect with the pipes and plumbing structures 40 having outlet valves and the like 42 at the ends thereof.

Uniquely provided in association with the ceiling pan 32 is an angle member 44, again preferably of stainless steel construction. The angle member 44 has spaced-apart holes 44A, 44B and 44C, passing through the vertically extending flange, as shown in FIG. 4. In use, a hole is cut in a walkable ceiling above the clean room, the hole being of a geometric configuration to receive the ceiling pan 32. The angle members 44 are placed on opposite sides of the opening, and the ceiling pan 32 is lifted through the opening with the upper portion thereof being adjacent to the upward extending flanges of the angle member 44. The upwardly extending edge of the ceiling pan 32 is provided with slotted holes (not shown) that align with the holes in the upwardly extending flange of the angle member 44. Preferably, the holes in the ceiling pan 32 are elongated slots to accommodate vertical positioning and adjustment of the pan with respect to the ceiling. Sheet metal screws or nuts, bolts, and lock washers may then be employed to secure the ceiling pan 32 to the vertically upwardly extending flange, with the horizontal flange providing support against the ceiling surface.

As shown in FIG. 6, the opening 46 is cut into the walkable ceiling 48 and the angle members 44 have been placed along opposite sides of that opening. With the holes in the ceiling pan 32 in alignment with the corresponding holes in the vertical flanges of the angle members 44, secured engagement between the ceiling pan and the angle members is achieved by sheet metal screws, nuts and bolts, or other appropriate fastening devices 50 as shown in FIGS. 5 and 6. It will be appreciated that an escutcheon or other finished trim piece may be placed about the perimeter of the ceiling pan 32 to conceal the cut opening 46 and to finish the installation.

Figure 7:
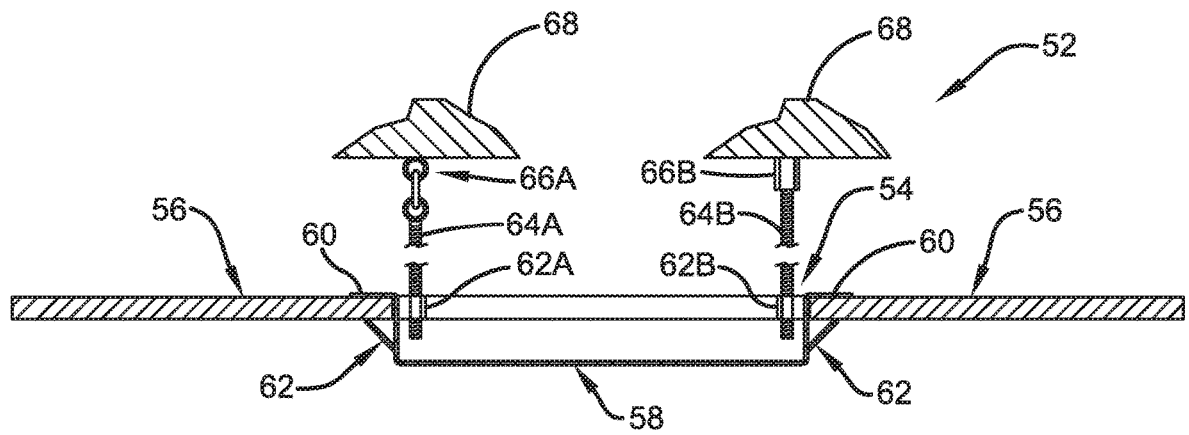
FIG. 7 is a side elevational schematic view of the installation of a utility panel according to the invention having unitary support flanges and means for infrastructure support.

With reference now to FIG. 7, a second embodiment of the pharmaceutical utility panel of the invention is seen and designated by the numeral 52. Here, an opening 54 is formed in a walkable ceiling 56, the opening being just slightly larger than the cross-section 58 of the panel 52. A flange or ledge 60 is received by the walking ceiling 56 when the utility panel 52 is dropped through the opening 54. This embodiment requires that the panel 52 be dropped or lowered through the opening 54, rather than being raised through the opening. The flanges or ledges 60 may be integrally formed as part and parcel of the panel 52 as shown by the cross-section 58 in FIG. 7. Such a structure eliminates the need for the separate angle member 44 as with the panel 30 of FIGS. 4-6.

Additionally, a finishing escutcheon member 62 may be interposed between the lower surface of the walkable ceiling 56 and the side of the utility panel 52 to effectively close the gap established by the opening 54.

As further shown in FIG. 7, a threaded member such as nut 62A, 62B may be secured at interior corners of the utility panel 52 as by welding or the like. The nuts 62A, 62B receive threaded rods 64A, 64B having appropriate fastening members 66A, 66B for mating engagement with the building infrastructure 68, such as beams, joists, and the like. The member 66A may, for example, comprise a pair of eyes, one at the end of threaded rod 64A and the other connected to the infrastructure 68, the eyes being wired or otherwise connected. Similarly, a nut 66B may be fixed to the infrastructure for receiving the threaded rod 64B. This arrangement may be used when the ceiling itself is not sufficiently strong to hold the panel and related equipment.

Figure 8:
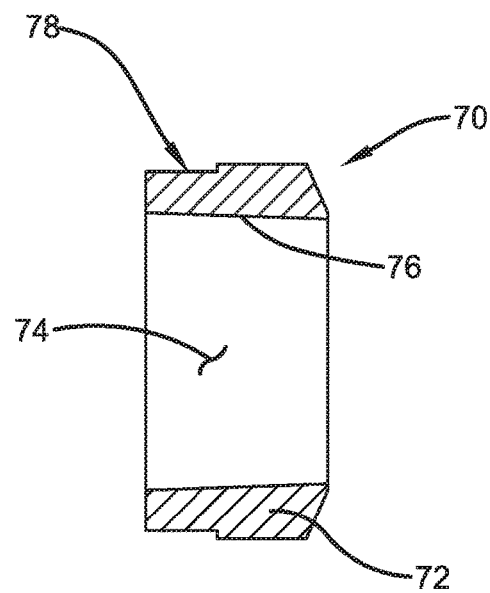
FIG. 8 is a side elevational view of a pipe hub made in accordance with the invention.

A feature of the invention herein is the use of pipe hubs, bends and the like employed within the piping system to establish inclines or declines to facilitate fluid movement. As shown in FIG. 8, a hub 70 has an outer cylindrical shell 72 about a passage 74. The axis of the passage 74 is offset from the axis of the hub 70 on the order of 1°-4°, and most preferably 2°, as used for reference herein. A reduced step 78 is provided to accommodate insertion into a wall to allow for passage of pipes at a 1°-4° pitch, and most preferably at 2°.

Figure 9A:
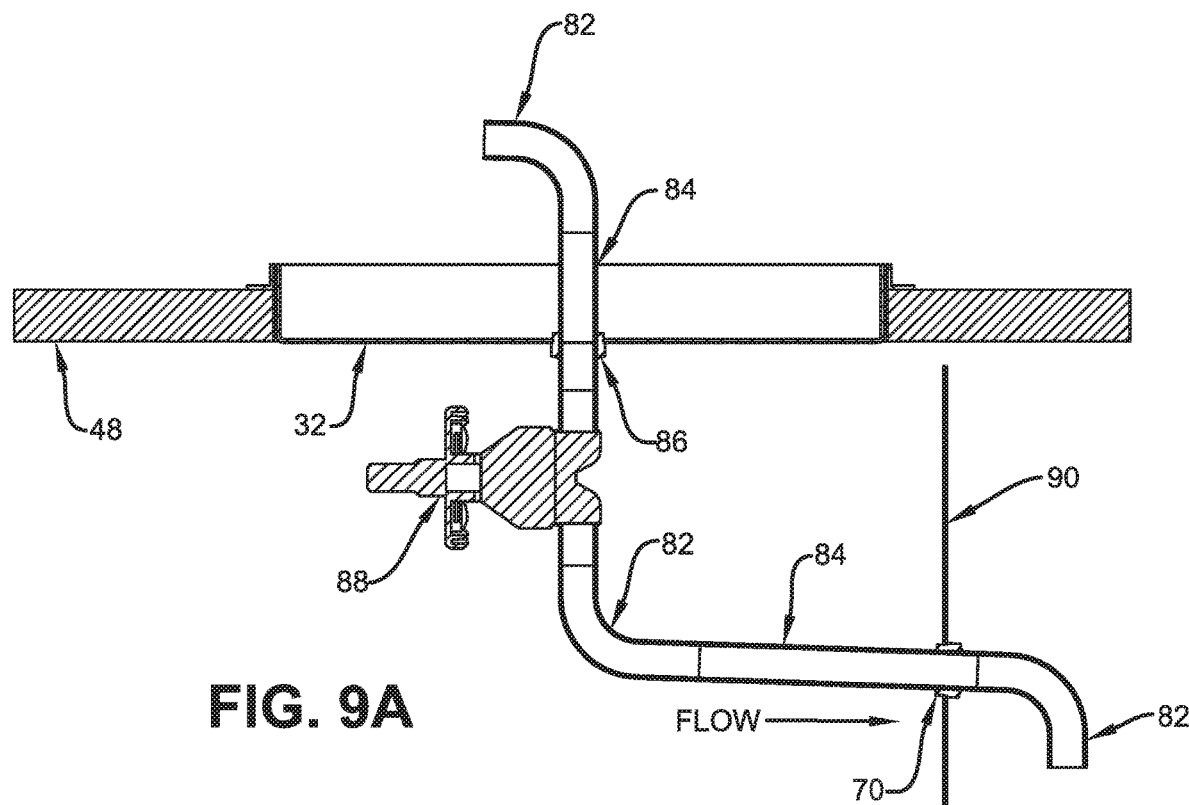
FIG. 9A is a system diagram of a pharmaceutical transport system employing the concepts of the invention.

With reference now to FIG. 9A, it can be seen that a partial diagram of a pharmaceutical transport system made in accordance with the invention is designated generally by the numeral 80. As shown, the flow of liquid or gas passes to an 88° elbow or bend 82 and then vertically downwardly through the pipe 84, through the ceiling pan 32 and associated straight hub 86 as shown. The pipe 84 continues through a control valve 88 to an 88° bend or elbow 82 to extend from vertical to substantially horizontal with a 2° decline. The pipe 84 then passes through a pipe hub 70, as shown in FIG. 8, having a passage 74 therethrough for receiving the pipe 84 at a preset angle, such as 2°. The pipe exits to a final 88° bend or elbow to a vertical outlet to a drain or processing equipment. The 2° hub 70 facilitates passage of the pipe 84 through the wall 90 while maintaining the 2° slope from horizontal. The bends 82 introduce a 2° slope from vertical to horizontal and a return to vertical from the slope.

Thus, the angles of the pipes are held true and accurate, are set by the elbows themselves at a desired angle of declination (or inclination), and when the pipe and hub are welded together, a fixed integral unit is achieved without risk of damage to the pipe 84 due to the size and nature of the associated hub serving as a heat sink for the welding operation.

Figure 9B:
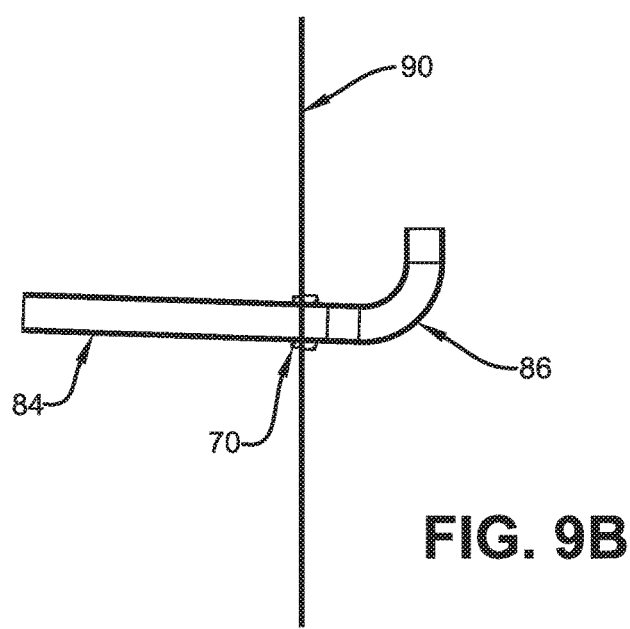
FIG. 9B illustrates the employment of the pipe hub of the invention employed for inclination rather than declination of the pipe.

With reference to FIG. 9B, it can be seen that the hub 70 can be used to accept pipe oriented in a declining posture or in an inclining posture. FIG. 9B shows the hub 70 used to establish an inclined slope to the pipe 84 as may be employed with a plumb riser employing a 92° bend 86.

Thus, it can be seen that instant invention provides for a pharmaceutical transport system that is easy to manufacture, construct and install, is cost-effective, and provides an operating system that is reliable and durable. While in accordance with the patent statutes only the best mode and preferred embodiments of the invention have been presented and described in detail, the invention is not limited thereto or thereby. Accordingly, for an appreciation of the scope and breadth of the invention, reference should be made to the following claims, which are presented for illustrative purposes only and are not required for a provisional patent application.

What is claimed is:

1. A pharmaceutical transport system, comprising:
   a utility panel received within an opening within a ceiling of a clean room and supported by said ceiling about at least portions of a perimeter of said utility panel;
   pipes extending from said utility panel into said clean room; and
   hubs receiving and passing said pipes at a slope from horizontal and through a vertical wall.

2. The pharmaceutical transport system according to claim 1, wherein said panel is supported by said ceiling within said opening by a flange extending from said panel and received upon a back side of said ceiling outside of said clean room.

3. The pharmaceutical transport system according to claim 2, wherein said flange is integral with said utility panel.

4. The pharmaceutical transport system according to claim 2, wherein said flange is a portion of an angle member adapted for selectable attachment to said utility panel.

5. The pharmaceutical transport system according to claim 1, wherein said hubs and pipes are made of stainless steel, interconnected by weldments, a mass of said hubs serving as heat sinks for said pipes during welding of said weldments.

6. The pharmaceutical transport system according to claim 1, wherein said hubs have a sloped passage for receiving and passing said pipes at a slope through the vertical wall.

7. The pharmaceutical transport system according to claim 6, further comprising bends interconnected with said pipes and transitioning certain of said pipes between a sloped horizontal orientation and a vertical orientation.

8. The pharmaceutical transport system according to claim 7, wherein said pipes are sloped between 1° and 4° from horizontal and said bends are at an angle of between 86° and 94°.

9. The pharmaceutical transport system according to claim 8, wherein said pipes are sloped at 2° from the horizontal and said bends are taken from a group consisting of 88° and 92° bends.

10. The pharmaceutical transport system according to claim 7, further comprising means for suspending said utility panel from an infrastructure of a building containing the clean room.

11. The pharmaceutical transport system according to claim 10, wherein said means for suspending comprises a threaded interconnection between the utility panel and the infrastructure.

12. The pharmaceutical transport system according to claim 11, wherein said means for suspending further comprises a threaded rod threadedly engaged at a first end with said utility panel and to the infrastructure at a second end by a securement taken from a group consisting of hook and eye engagement and threaded engagement.

13. A liquid transport system, comprising:
   a utility panel received within an opening of a ceiling within a room;
   a flange extending from said panel, said flange received and supported by a back side of the ceiling;
   pipes extending from outside the room through said utility panel, into the room, and then from the room; and
   hubs and bends interconnecting said pipes as they pass into, through, and out of the room.

14. The liquid transport system according to claim 13, wherein at least one of said hubs has a sloped passage receiving and passing certain of said pipes at a slope from horizontal.

15. The liquid transport system according to claim 14, wherein at least certain of said bends interconnect with certain of said pipes to transition said pipes between sloped horizontal and vertical orientations.

16. The liquid transport system according to claim 15, wherein said bends form angles of between 86° and 94° and said pipes are sloped between 1° and 4° from horizontal.

17. The liquid transport system according to claim 16, wherein said pipes are sloped at 2° from horizontal and said bends are taken from a group consisting of 88° and 92° bends.

18. The liquid transport system according to claim 15, further comprising a supporting interconnection between the utility panel and an infrastructure of a building containing the room.

19. The liquid transport system according to claim 18, wherein said supporting interconnection comprises threaded engagement.

20. The liquid transport system according to claim 19, wherein said supporting interconnection further comprises interconnected eyes.

* * * * *